United States Patent [19]

Hawkins

[11] 4,338,040

[45] Jul. 6, 1982

[54] WHALER RETAINER

[76] Inventor: James H. Hawkins, 27796 Seco Canyon, Saugus, Calif. 91350

[21] Appl. No.: 230,128

[22] Filed: Jan. 30, 1981

[51] Int. Cl.³ .......................... F16B 2/02; E04G 7/12
[52] U.S. Cl. .................................. 403/385; 403/400; 182/113
[58] Field of Search .............. 403/385, 400, 394, 391; 256/69, 68, DIG. 6, 67; 182/113

[56] References Cited

U.S. PATENT DOCUMENTS

| | | | |
|---|---|---|---|
| 2,245,661 | 6/1941 | Fieroh | 182/113 X |
| 2,329,415 | 9/1943 | Osborne | 182/113 X |
| 3,467,418 | 9/1969 | Redditt | 403/391 X |

Primary Examiner—Andrew V. Kundrat
Attorney, Agent, or Firm—Roger A. Marrs

[57] ABSTRACT

A whaler corner box arrangement is disclosed herein for holding a pair of beams at right angles to each other which includes an enclosure having a pair of open-ended passageways extending normal with respect to each other so as to insertably receive the opposing and adjacent ends of beams intended to be temporarily joined together. A plurality of holes are provided in the enclosure in communication with each of the passageways for accommodating the introduction of nails therethrough into the beams within the respective passageways. Rotary clamp retainers are operably carried on the enclosure for releasably engaging with each beam preparatory to the nailing procedure.

4 Claims, 6 Drawing Figures

WHALER RETAINER

BACKGROUND OF THE INVENTION

1. Field of the Invention

This invention relates to whaler retainers and more particularly, to a novel corner box enclosure for receiving the opposing ends of a pair of construction beams at right angles with respect to each other so as to hold the beams in this relationship temporarily.

2. Brief Description of the Prior Art

In the past, it has been the standard procedure in the construction industry to employ whalers such as beams for supporting foundations and other structural constructions so that the beams are in a particular relationship with respect to each other. For example, it is often necessary during construction to place the opposing ends of a pair of beams at right angles to each other so that a ninety degree corner is formed. In some instances, other angular dispositions are required. Normally, the beams are placed at a desired angle using a protractor or other preform having the desire angle established in which case the preform is used as a template. Once the relationship has been established, it is then the normal practice to temporarily secure the crossed and opposing ends of the beams together by use of nails which are driven through the overlapping portions of the beams.

In this manner, the beams are crossed over one another at the desired angle and the nails temporarily retain the beams in this particular position. In some instances, it is desired to then remove the whaler construction formed by the two beams and this is readily accomplished by removing the nails and manually disassembling the overlapping beams.

Problems and difficulties have been encountered when practising the above procedure which stems largely from the fact that separate templates or preforms are used and the whaler beams are manually aligned to the desired angle whether the template is used or not. Also, even when a template is used, the beams often slip with respect to one another so that realignment is required or the beams are temporarily secured to one another at the misaligned angle.

Therefore, a long standing need has existed to provide a corner box or the like which will readily accept the adjacent ends of beams which are crossed over one another so that the beams are properly aligned to a desired angle.

SUMMARY OF THE INVENTION

Accordingly, the above problems and difficulties are obviated by the present invention which provides a novel box arrangement for accepting the opposing ends of a pair of beams in an overlap or cross over orientation whereby the pair of beams are arranged at a desired angle with respect to each other. The box arrangement includes an enclosure having a pair of open-ended passageways extending at the desired angle with respect to each other so as to insertably receive the opposing and adjacent ends of the beams intended to be temporarily joined together. The enclosure includes the passageways on top of one another so that they lie substantially on the same central vertical axis and the enclosure includes a plurality of holes in communication with each of the passageways for accommodating the introduction and passage of nails therethrough into the beams within the respective passageways. Rotating clamp means are operably carried on the enclosure for releasably engaging with each beam preparatory to the nailing procedure. In one form, the rotating clamp means includes a screw or bolt which is threadably carried on each side of the enclosure and which moves into each of the respective passageways. Another embodiment of the invention includes a hand crank carried on opposite sides of the enclosure for passing into the respective passageways into engagement with the beams.

Therefore, it is among the primary objects of the present invention to provide a novel box arrangement for temporarily holding a pair of beams at a desired angle with respect to one another so that the beams may be properly aligned and held together at the desired orientation in a shortened period of time.

Another object of the present invention is to provide a novel means for aligning and holding a pair of cross beams at a proper angle with respect to each other.

Still a further object of the present invention is to provide an inexpensive and economic device for properly aligning crossed over beams so that the beams will lie at a preferred angle with respect to each other and wherein the means includes temporarily restraining or holding the beams in the preferred orientation.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings, in which:

DESCRIPTION OF PREFERRED EMBODIMENT

Figure 1:
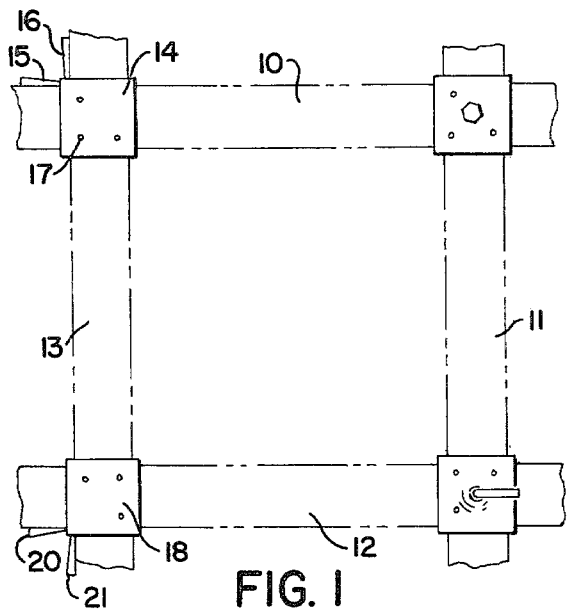
FIG. 1 is a top plan view of a typical construction incorporating the box arrangement of the present invention for aligning crossed over beams with respect to each other.

Referring to FIG. 1, a simple construction or form is illustrated wherein beams 10, 11, 12 and 13 are arranged so that their opposing and adjacent ends are disposed at a preferred angle such as 90 degrees with respect to each other. In order to insure that the proper and desired relationship is established, one embodiment of the present invention is employed and is indicated by numeral 14 in which the opposing and adjacent ends of beams 10 and 13 are overlapped or crossed over one another respectively. The respective ends of the beams are passed through the device 14 and are maintained in fixed position by means of a series of wedges such as wedges 15 and 16. Also, the beams are held temporarily in position by a series of nails such as indicated by nail 17. A similar arrangement is shown with respect to the overlapping ends of beams 12 and 13 and an identical device to that of device 14 is employed and is represented by numeral 18. In this instance, wedges 20 and 21 are employed.

Figure 2:
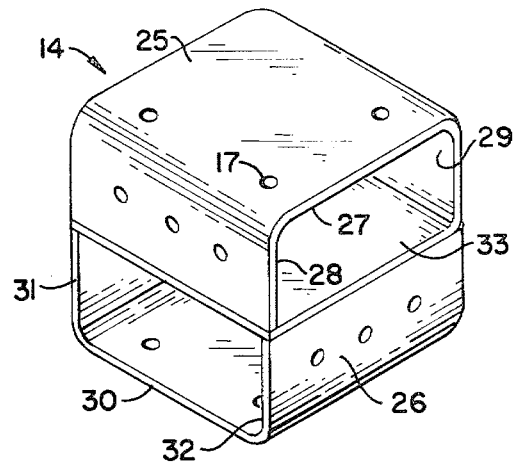
FIG. 2 is a front perspective view of a corner box arrangement incorporating the present invention as used on one corner in the illustration of FIG. 1.

Referring now in detail to FIG. 2, the corner device 14 is illustrated as comprising an enclosure having an upper section 25 and a lower section 26. Both the upper and lower sections define open ended passageways which are arranged normal to each other so as to provide the desired angle or orientation for the ends of the beams when insertably received within the passageways. The passageway associated with the upper section 25 is defined by a U-shaped member having a top 27 terminating at its opposite ends in downwardly depending sides 28 and 29. The lower section 26 defines its passageway by a bottom 30 having integrally formed opposite sides 31 and 32. Preferably, the upper and lower sections are U-shaped in cross section and are joined at their free ends to a central flat plate 33. In one form of the invention, the flat plate 33 may be integral and continuous with one of the sides such as side 29. Therefore, the upper and lower sections are joined by welding along common contacting surfaces so that the upper and lower sections as well as the plate 33 whether it be separate or integral are joined securely together. Therefore, the passageways defined by the upper and lower sections are fixed at the desired angle with respect to each other. In the present instance, the passageways are arranged normal to one another so as to provide a 90 degree orientation of the passageways. The passageways are on top of one another so that when the beams are inserted the beams will be overlapping or crossed. Therefore, the passageways lie on the same central vertical axis so that they are in registry with respect to the width of the beams and therefore the width of the passageway.

The upper and lower sections are provided with holes, such as hole 17 through which nails may be disposed so as to secure with the beam in the respective passageway. Holes are provided along the top plate 27 as well as the bottom plate 30 and can equally be disposed or provided along the sides such as side 26 and side 28.

Figure 4:
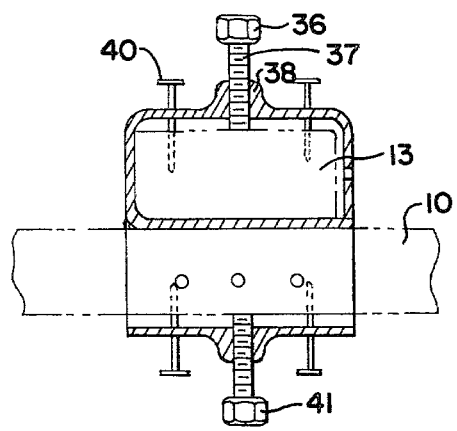
FIG. 4 is a transverse cross sectional view of the box arrangement shown in FIG. 3 as taken in the direction of arrows 4—4 thereof.
Figure 3:
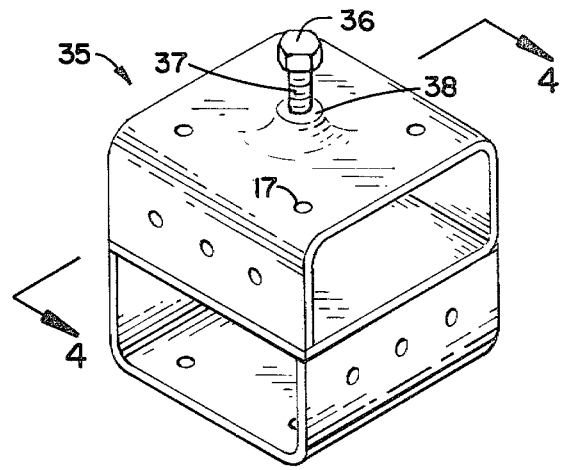
FIG. 3 is a front perspective view of another embodiment of the present invention which includes a rotary clamping means.

Another embodiment of the present invention is shown in FIG. 3 which is identical to the construction of corner device 14 and is shown in the general direction of arrow 35. However, the device has been modified to include a beam engagement means or retaining means which comprises a bolt 36 having a threaded shank 37 threadably engaged with a bore in circular shoulder 38. As shown in FIG. 4, the bolt moves its respected shank up and down through the shoulder 38 so that the free end of the shank 37 engages with the opposing surface of the beam. It can also be seen that nails, such as nail 40 is driven through hole 17 into the passageway and then into the beam 13.

The lower section is also provided with an identical type retaining means which takes the form of a bolt 41.

Figure 6:
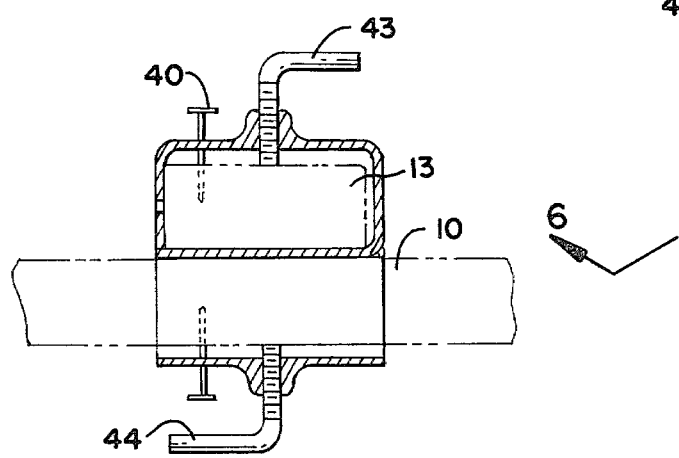
FIG. 6 is a transverse cross sectional view of the embodiment shown in FIG. 5 as taken in the direction of arrows 6—6 thereof.
Figure 5:
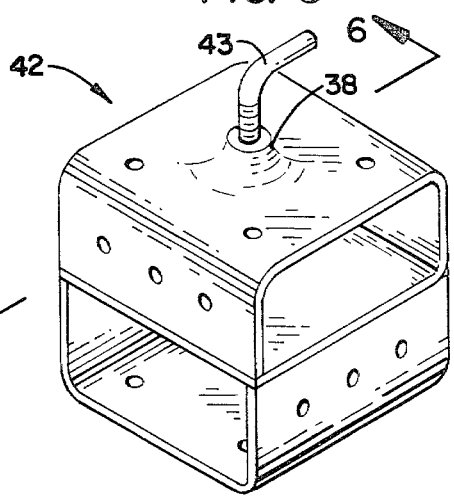
FIG. 5 is a front perspective view of another embodiment of the present invention illustrating a different rotary clamp device.

Referring now in detail to FIG. 5, another embodiment of the present invention is shown in the general direction of arrow 42 which is identical to the devices or units previously described which incorporates a different retaining means. Instead of the bolt 36, a crank 43 is employed in threaded relationship with the circular shoulder 38. In FIG. 6, the crank has been rotated so that the shank of the crank is extending into the passageway and into contact with the beam 13. Nail 40 is incorporated for temporarily holding the structure and the beams together. The lower unit is provided with an identical crank as indicated by the numeral 44.

In view of the foregoing, it can be seen that the novel whaler retainer or holder of the present invention provides a box-like construction having an enclosure composed of an upper and a lower section defining a pair of passageways which are oriented with respect to each other at a particular degree or angle. The ends of beams are insertably received through the respective passageways and the beams are slid through the passageways until in the desired position. At this point, the cranks or bolts, if employed, may be rotated to engage with the respective beams. Subsequently, nails are introduced through the holes and into the beam occupying the particular passageways. Once the form has been completed and is no longer needed, disassembly may be achieved by removing the nails and loosening the rotary retainers such as the bolt 36 or the crank 43. Subsequently, the beams may then be slid out of the passageways and the device is ready for reuse.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

What is claimed is:

1. A whaler retainer for temporarily supporting a pair of overlapping beams at a predetermined angle with respect to each other, the combination comprising:

a box-like housing having a pair of open-ended passageways extending normal with respect to each other so as to insertably receive the opposing and adjacent ends of said beams;

said housing being provided with a plurality of holes in the top and a side wall of each of said housing passageways;

impact fasteners adapted to be forcibly urged into each of said beams via said plurality of holes;

said housing passageways being disposed over each other so that inserted beams overlap;

adjustable fastening means operably carried on the opposite top walls of said housing passageways for movement into and out of each of said passageways to releasably retain said beams in their respective passageways;

said adjustable fastening means includes a pair of rotary members threadably engaged with each of said opposite top walls of said housing passageways, and with all the walls of one of said housing passageways being part of a unitary piece.

2. The invention as defined in claim 1 wherein:
said adjustable fastening means is a bolt.

3. The invention as defined in claim 1 wherein:
said adjustable means is a crank having a handle for manually rotating said crank.

4. The invention as defined in claim 1 wherein:
said housing is provided with a lower U-shaped section and an upper U-shaped section; and
a flat plate having its opposite edges contiguous with the sides of said U-shaped sections and joining the ends of said U-shaped sections together to provide a unitary construction.

* * * * *